| (12) | United States Patent | (10) Patent No.: US 11,252,088 B2 |
|---|---|---|
| | Tadimeti et al. | (45) Date of Patent: Feb. 15, 2022 |

(54) METHODS AND SYSTEMS FOR NETWORK CONGESTION MANAGEMENT

(71) Applicant: Pensando Systems Inc., Milpitas, CA (US)

(72) Inventors: Raja Rao Tadimeti, Milpitas, CA (US); Vijay K. Chander, San Ramon, CA (US); Diego Crupnicoff, Buenos Aires (AR); Vishal Jain, San Jose, CA (US); Madhava Rao Cheethirala, San Jose, CA (US)

(73) Assignee: PENSANDO SYSTEMS INC., Milpitas, CA (US)

( * ) Notice: Subject to any disclaimer, the term of this patent is extended or adjusted under 35 U.S.C. 154(b) by 84 days.

(21) Appl. No.: 16/643,311

(22) PCT Filed: Aug. 30, 2018

(86) PCT No.: PCT/US2018/048893
§ 371 (c)(1),
(2) Date: Feb. 28, 2020

(87) PCT Pub. No.: WO2019/046603
PCT Pub. Date: Mar. 7, 2019

(65) Prior Publication Data
US 2020/0336426 A1 Oct. 22, 2020

Related U.S. Application Data

(60) Provisional application No. 62/553,017, filed on Aug. 31, 2017.

(51) Int. Cl.
*H04L 12/801* (2013.01)
*H04L 12/26* (2006.01)

(52) U.S. Cl.
CPC ......... *H04L 47/115* (2013.01); *H04L 43/062* (2013.01); *H04L 43/0852* (2013.01); *H04L 43/106* (2013.01); *H04L 43/16* (2013.01)

(58) Field of Classification Search
None
See application file for complete search history.

(56) References Cited

U.S. PATENT DOCUMENTS 7,688,968 B1 * 3/2010 Chen ..................... H04B 3/32
379/406.08
8,813,225 B1 8/2014 Fuller et al.
(Continued)

FOREIGN PATENT DOCUMENTS

EP 2522109 A1 11/2012
WO WO-0233896 A2 4/2002
(Continued)

OTHER PUBLICATIONS

Liu et al. Offloading distributed applications onto smartnics using ipipe. Proceedings of the ACM Special Interest Group on Data Communication pp. 318-333 (2019).
(Continued)

*Primary Examiner* — Anh Ngoc M Nguyen
(74) *Attorney, Agent, or Firm* — Wilson Sonsini Goodrich & Rosati

(57) ABSTRACT

A method for managing network congestion is provided. The method comprises: receiving, at a receiver, a packet comprising a timestamp provided by a first clock of a sender; deriving, by the receiver, a latency value based at least in part on the timestamp provided by the first clock and a receipt time provided by a second clock of the receiver; determining a latency change by comparing the latency
(Continued)

value with a previous latency value; and determining a state of network congestion based at least in part on the latency change.

44 Claims, 7 Drawing Sheets

(56) References Cited

U.S. PATENT DOCUMENTS

| | | | |
|---|---|---|---|
| 10,104,039 B1 | 10/2018 | Knecht et al. | |
| 2003/0174649 A1 | 9/2003 | Shankar et al. | |
| 2004/0071085 A1* | 4/2004 | Shaham | H04L 1/0026 370/230 |
| 2006/0050640 A1 | 3/2006 | Jin et al. | |
| 2006/0153179 A1 | 7/2006 | Ho et al. | |
| 2008/0037420 A1 | 2/2008 | Tang | |
| 2008/0084900 A1* | 4/2008 | Dunn | H04N 21/23406 370/516 |
| 2008/0181112 A1 | 7/2008 | Beck et al. | |
| 2008/0304412 A1* | 12/2008 | Schine | H04L 41/5003 370/235 |
| 2010/0011118 A1* | 1/2010 | Chang | H04L 47/11 709/235 |
| 2010/0031042 A1 | 2/2010 | Di Crescenzo et al. | |
| 2013/0195123 A1* | 8/2013 | Stern | H04J 3/0664 370/503 |
| 2013/0204965 A1 | 8/2013 | Masputra et al. | |
| 2013/0279338 A1 | 10/2013 | Mehrotra et al. | |
| 2013/0322247 A1 | 12/2013 | Li et al. | |
| 2014/0003242 A1 | 1/2014 | Nadas et al. | |
| 2014/0164641 A1 | 6/2014 | Ye et al. | |
| 2014/0177455 A1 | 6/2014 | Astigarraga et al. | |
| 2014/0348182 A1* | 11/2014 | Chandra | H04J 3/0697 370/503 |
| 2015/0341273 A1 | 11/2015 | Naouri et al. | |
| 2016/0036909 A1* | 2/2016 | Joshi | H04L 67/1097 709/217 |
| 2016/0212098 A1 | 7/2016 | Roch | |
| 2016/0374094 A1 | 12/2016 | Bakshe et al. | |
| 2017/0019803 A1 | 1/2017 | Nguyen et al. | |
| 2017/0078205 A1 | 3/2017 | Stalling et al. | |
| 2017/0163633 A1 | 6/2017 | Yang et al. | |
| 2018/0212885 A1 | 7/2018 | Contavalli et al. | |
| 2018/0302328 A1 | 10/2018 | Keith et al. | |
| 2019/0386913 A1 | 12/2019 | Wei | |
| 2020/0076736 A1 | 3/2020 | Tilli | |
| 2020/0382426 A1 | 12/2020 | Li et al. | |

FOREIGN PATENT DOCUMENTS

| | | |
|---|---|---|
| WO | WO-2019046603 A1 | 3/2019 |
| WO | WO-2019133434 A1 | 7/2019 |
| WO | WO-2019164827 A1 | 8/2019 |
| WO | WO-2019209181 A1 | 10/2019 |
| WO | WO-2020236599 A1 | 11/2020 |
| WO | WO-2021041622 A1 | 3/2021 |
| WO | WO-2021155282 A1 | 8/2021 |
| WO | WO-2021207231 A1 | 10/2021 |

OTHER PUBLICATIONS

PCT/US2020/048127 International Search Report and Written Opinion dated Jan. 21, 2021.
PCT/US2020/048127 Invitation to Pay Additional Fees dated Nov. 4, 2020.
PCT/US2020/048127 Invitation to Pay Additional Fees dated Oct. 4, 2020.
PCT/US2021/015896 International Search Report and Written Opinion dated Apr. 14, 2021.
U.S. Appl. No. 16/553,947 Office Action dated Dec. 1, 2020.
U.S. Appl. No. 16/553,947 Office Action dated Jan. 27, 2021.
PCT/US2021/026001 International Search Report and Written Opinion dated Jun. 30, 2021.
U.S. Appl. No. 16/415,609 Office Action dated May 5, 2021.
PCT/US2018/048893 International Search Report and Written Opinion dated Jan. 3, 2019.
Co-pending US patent application No. U.S. Appl. No. 16/415,609, filed May 17, 2019.
Co-pending US patent application No. U.S. Appl. No. 16/553,947, filed Aug. 28, 2019.
Co-pending US patent application No. U.S. Appl. No. 16/779,096, filed Jan. 31, 2020.
Co-pending US patent application No. U.S. Appl. No. 16/842,537, filed Apr. 7, 2020.
Co-pending US patent application No. U.S. Appl. No. 16/860,650, filed Apr. 28, 2020.
PCT/US2020/033154 International Search Report and Written Opinion dated Aug. 26, 2020.
Co-pending U.S. Appl. No. 17/523,732, inventors Pan; Rong et al., filed Nov. 10, 2021.
U.S. Appl. No. 16/842,537 Office Action dated Oct. 15, 2021.
EP18852029.0 Extended European Search Report dated Apr. 22, 2021.
PCT/US2018/048893 International Preliminary Report on Patentability dated Mar. 3, 2020.
PCT/US2020/033154 International Preliminary Report on Patentability dated Nov. 16, 2021.

* cited by examiner

METHODS AND SYSTEMS FOR NETWORK CONGESTION MANAGEMENT

CROSS-REFERENCE TO RELATED APPLICATIONS

This application is the National Stage entry of International Application No. PCT/US2018/048893, filed Aug. 30, 2018, which claims the priority and benefit of U.S. Provisional Application No. 62/553,017 filed Aug. 31, 2017, Entitled: METHODS AND SYSTEMS FOR NETWORK CONGESTION MANAGEMENT, the entire contents of which are incorporated herein by reference in their entirety.

BACKGROUND

Congestion situations arise in data communication networks such as when the available transmission capacity of a network node or link is lower than the data rate it needs to relay. Such congestion problems are typically handled by congestion control or congestion management mechanism. Currently, there are several congestion management mechanisms employed to avoid, mitigate, and handle congestion problems. In an example, congestion management mechanisms based on network devices (switch/routers) may be used for detecting congestion. For instance, Quantized Congestion Notification (QCN) is a standardized method for the network switches to convey congestion notifications back to the source nodes. In another instance, Explicit Congestion Notification (ECN) is used in the network to provide single-bit feedback to the end-nodes. However, such congestion management methods rely on the networks devices feedbacks which require additional configurations and tuning of intermediate network devices. Moreover, signals derived from queue occupancy such as ECN fail to directly inform end-to-end latency inflated by network queueing. An ECN mark on a packet simply indicates that the queue measure corresponding to the packet exceeds a threshold. In another example, congestion can be detected by measurement of round trip time (RTT). For instance, a queuing delay along a network path between a source and a destination in a network is determined based on the RTT measured along the network path. However, RTT based congestion detection scheme is limited that RTT measurement lump queueing in both directions along the network path. This may confuse reverse path congestion experienced by acknowledgement (ACK) with forward path congestion experienced by data packets.

INCORPORATION BY REFERENCE

All publications, patents, and patent applications mentioned in this specification are herein incorporated by reference to the same extent as if each individual publication, patent, or patent application was specifically and individually indicated to be incorporated by reference.

SUMMARY

In light of the above, it would be desirable to provide a method and system for improved congestion management based on one-way congestion state. Congestion state may be determined based on forward path latency particularly a variation of latency in one-way delay between two or more packets. The congestion state may relate to a queueing delay along a forward network path from a sender to a receiver. The congestion state may be determined based at least part on the variation of latency measured along the forward path. The variation of latency may be measured by embedding a timestamp in a packet then the change in latency is then the change in the arrival time minus send time of each packet. The forward path latency measurement may not require synchronized clocks. An injection rate of data packets may be calculated based at least in part on the variation of latency and/or a delivery rate in an interval.

The provided congestion management method and system may be operable to execute at various levels (e.g., Layer 2 such as Ethernet, Layer 3 such as Internet Protocol, Layer 4 such as Transmission Control Protocol, User Datagram Protocol and/or remote direct memory access (RDMA)) without relying on intermediate network hardware, independent of the communication protocol used between endpoints. Methods and systems of the present disclosure can be part of the functionality of any layer, typically the link layer, the network layer, the transport layer or the application layer, and can reside in the end nodes or of a network. Additionally, the methods and systems can reside in any node of a network such as the intermediate nodes.

In one aspect, a method for managing network congestion is provided. The method may comprise: (a) receiving, at a receiver, a packet comprising a timestamp provided by a first clock of a sender; (b) deriving, by the receiver, a latency value based at least in part on the timestamp provided by the first clock and a receipt time provided by a second clock of the receiver; (c) determining a latency change by comparing the latency value with a previous latency value; and (d) determining a state of network congestion based at least in part on the latency change.

In a related yet separate aspect, a system for managing network congestion is provided. The system may comprise: (a) a memory for storing one or more previously obtained latency values and a set of instructions; and (b) one or more processors configured to execute the set of instructions to: (i) receive a packet comprising a timestamp provided by a first clock of a sender; (ii) derive a latency value based at least in part on the timestamp provided by the first clock and a receipt time provided by a second clock of a receiver; (iii) determine a latency change by comparing the latency value with a previous latency value from the one or more previously obtained latency values; and (iv) determine a state of network congestion based at least in part on the latency change.

In some embodiments, the packet is a regular packet. In some embodiments, the first clock and the second clock are not synchronized. In some embodiments, the first clock and the second clock operate at a pre-determined frequency. In some cases, the pre-determined frequency is set up prior to transmission of the packet or is set up by a connection protocol. In some embodiments, the first clock and the second clock operate at different frequencies. In some cases, the frequency of the first clock is known by the receiver during a connection setup between the sender and receiver. In some cases, a frequency drift is prevented by resetting one or more previously obtained latency values stored in a memory accessible by the receiver. In some cases, a frequency drift is detected based on a minimum latency value tracked by the sender. Alternatively, the packet can be any packet such as a congestion notification packet.

In some embodiments, the latency value is associated with a forward path latency. In some embodiments, the latency value is derived by calculating the time difference between the timestamp and the receipt time provided by the second clock. In some embodiments, the previous latency value is a minimum latency value or a latency value of a first packet among one or more previously obtained latency values. In some cases, the one or more previously obtained latency values are calculated by the receiver and stored in a memory accessible by the receiver. In some cases, the minimum latency value is updated when the latency change is a decrease.

In some embodiments, the state of network congestion is determined by comparing the latency change against a threshold. In some cases, the threshold is configurable. In some cases, the state of network congestion is determined when the latency change is above the threshold. In some cases, the latency change is obtained by comparing an average of a sequence of latency values within a window with the previous latency value. In some embodiments, the latency change is determined by the receiver. In alternative embodiments, the latency change is determined by the sender. In some embodiments, the state of network congestion is determined by the receiver. Alternatively, the state of network congestion is determined by the sender.

In some embodiments, the method further comprises generating a report message comprising the latency change. In some cases, the report message is a congestion notification packet. Alternatively, the report message is contained in a regular data packet transmitted from the receiver to the sender. In some embodiments, the report message is transmitted from the receiver to the sender. In some situations, the report message is generated upon determination of the state of network congestion. In some situations, the report message is generated at receipt of the packet by the receiver or when a lapse of time since last received packet exceeds a pre-determined lapse threshold. In some cases, the report message further comprises a minimum latency value among one or more previously obtained latency values and/or a delivery rate.

In some embodiments, the method further comprises adjusting a packet flow rate when a lapse of time since last received report message exceeds a pre-determined lapse threshold. In some embodiments, the method further comprises adjusting a packet flow rate based at least in part on the latency change. In some cases, the packet flow rate is adjusted in response to the latency change according to a pre-determined reaction scheme. For example, the reaction scheme comprises adjusting the packet flow rate based on the latency change, the first order derivative of latency change, the second order derivative of latency change, a delivery rate, or a combination of the above. In some cases, the reaction scheme comprises one or more coefficients for adjusting the packet flow rate.

In another aspect, a method for managing network congestion is provided. The method may comprise: (a) receiving, at a sender, a report message comprising a latency change, wherein the latency change is associated with a one-way path from the sender to a receiver; and (b) adjusting a packet flow rate based at least in part on the latency change.

In a related yet separate aspect, a system for managing network congestion is provided. The system comprises: (a) a memory for storing a set of instructions; and (b) one or more processors configured to execute the set of instructions to: (i) receive, a report message comprising a latency change, wherein the latency change is associated with a one-way path from a sender to a receiver; and (ii) adjust a packet flow rate based at least in part on the latency change.

In some embodiments, the latency change is obtained by comparing a latency value with a previous latency value. In some cases, the latency value is obtained based at least in part on a timestamp provided by a first clock of the sender and a receipt time provided by a second clock of the receiver. In some cases, the first clock and the second clock are not synchronized. In some cases, the previous latency value is a minimum latency value or a latency value of a first packet among one or more previously obtained latency values.

In some embodiments, the latency change is obtained by comparing an average of a sequence of latency values within a window with a previous latency value. In some embodiments, the report message is a congestion notification packet generated by the receiver. In some cases, the congestion notification packet is generated upon determination of a state of network congestion. In some situations, state of network congestion is determined by comparing the latency change against a threshold. The threshold is pre-determined or configurable. In some cases, the state of network congestion is determined when the latency change is above the threshold. In some cases, the congestion notification packet is generated at receipt of a packet by the receiver or when a lapse of time since last received packet exceeds a pre-determined lapse threshold, and wherein the packet is generated by the sender.

In some embodiments, the report message further comprises a minimum latency value among one or more previously obtained latency values and/or a delivery rate. The method may further comprise adjusting the packet flow rate when a lapse of time since last received report message by the sender exceeds a pre-determined lapse threshold. In some cases, the minimum latency value is used for deriving a queueing delay.

In some embodiments, the packet flow rate is adjusted in response to the latency change according to a pre-determined reaction scheme. In some cases, the reaction scheme comprises adjusting the packet flow rate based on the latency change, the first order derivative of latency change, the second order derivative of latency change, a delivery rate or a combination of the above. In some situations, the reaction scheme comprises one or more coefficients for adjusting the packet flow rate. In some embodiments, the one or more processors are local to the sender.

It shall be understood that different aspects of the invention can be appreciated individually, collectively, or in combination with each other. Various aspects of the invention described herein may be applied to any of the particular applications set forth below or for any other types of the congestion control/management system disclosed herein. Any description herein concerning the congestion state measurement may apply to and be used for any other congestion management situations. Additionally, any embodiments disclosed in the context of the congestion management system are also applicable to the methods disclosed herein.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
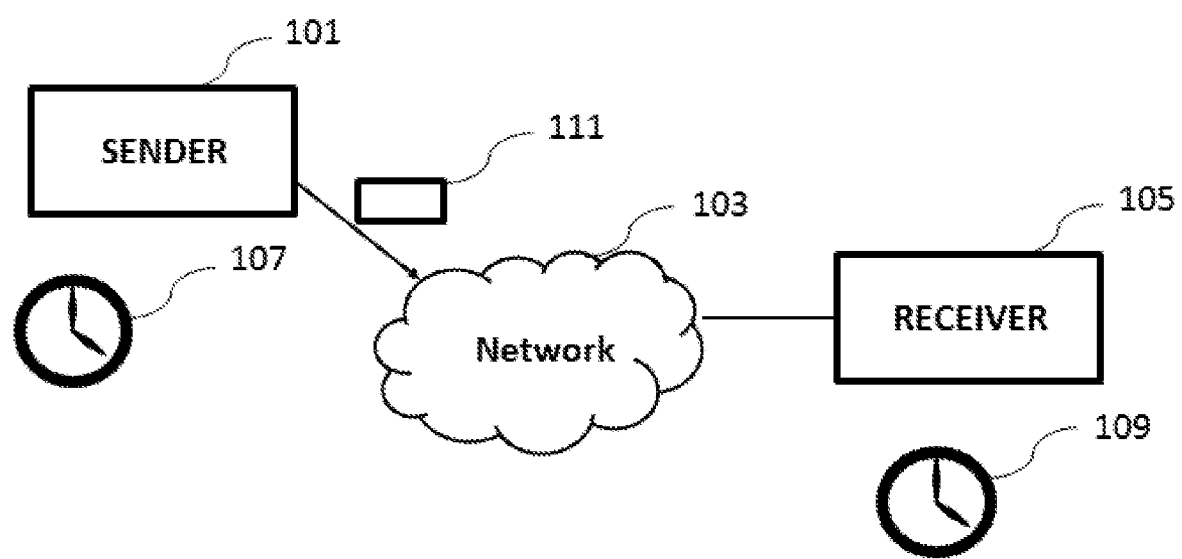
FIG. 1 is an exemplary block diagram illustrating communication over a network, in accordance with embodiments of the invention.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface,", "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" where used herein to means serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "change," "variation," "difference," "differential," "derivative" and the like are used interchangeably unless context suggests otherwise. The terms can refer to a difference between two values unless context suggests otherwise.

Embodiments of the invention may be used in a variety of applications. Some embodiments of the invention may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, a wireless communication station, a wireless communication device, a wireless access point (AP), a modem, a network, a wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, or the like.

It is noted that various embodiments can be used in conjunction with one or more types of wireless or wired communication signals and/or systems, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like. Embodiments of the invention may be used in various other devices, systems, and/or networks.

While portions of this disclosure, for demonstrative purposes, refer to wired and/or wired communication systems or methods, embodiments of the invention are not limited in this regard. As an example, one or more wired communication systems, can utilize one or more wireless communication components, one or more wireless communication methods or protocols, or the like.

Although some portions of the discussion herein may relate, for demonstrative purposes, to a fast or high-speed interconnect infrastructure, to a fast or high-speed interconnect component or adapter with OS bypass capabilities, to a fast or high-speed interconnect card or Network Interface Card (NIC) with OS bypass capabilities, or to a to a fast or high-speed interconnect infrastructure or fabric, embodiments of the invention are not limited in this regard, and may be used in conjunction with other infrastructures, fabrics, components, adapters, host channel adapters, cards or NICs, which may or may not necessarily be fast or high-speed or with OS bypass capabilities. For example, some embodiments of the invention may be utilized in conjunction with InfiniBand (IB) infrastructures, fabrics, components, adapters, host channel adapters, cards or NICs; with Ethernet infrastructures, fabrics, components, adapters, host channel adapters, cards or NICs; with gigabit Ethernet (GEth) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs; with infrastructures, fabrics, components, adapters, host channel adapters, cards or NICs that are connectionless and/or stateless; and/or other suitable hardware.

The terms "congested," "congestion," "network congestion," and the like are used interchangeably unless context suggests otherwise. The terms can refer to a one or more characteristics, metrics, and/or properties of a network meeting or exceeding a threshold level(s), unless context suggests otherwise. The threshold level(s) being determined as a maximum and/or minimum level(s) of the one or more characteristics, metrics, and/or properties of a network needed to satisfy a condition of a congested network. A state of network congestion is determined in connection with one or more thresholds or is determined in a continuous fashion with granularity.

In one aspect, methods and systems of the present disclosure are provided for determining a network congestion state based on measurement of a variation of forward path latency. The variation or change of forward path latency may be used as the congestion signal thus the sender may be timely informed about the extent of congestion. FIG. 1 is an exemplary block diagram illustrating communication over a network 103, in accordance with embodiments of the invention. A sender 101 and a receiver 105 are in communication over the network 103. Packets can be sent from the sender to the receiver or receiver to sender. The communication may employ congestion management mechanism to control congestion. In some cases, a state of network congestion along the forward path (from sender to receiver) may be determined. The sender and receiver may also be referred to as source and destination respectively.

The sender 101 and the receiver 105 can be various types of computing devices such as personal computers, tablet computers, smart phones, set top boxes, desktop computers, laptops, gaming systems, servers, data centers, and various other devices or systems. A plurality of other devices or components can establish a connection through the network. One or more senders can connect with one or more receivers. The sender and the receiver can connect to the network with wired and/or wireless connection. The sender or receiver may be referred to as a source node and destination node in the network. A node may be any device equipped with communication capabilities. The communications may be wired or wireless communications. The node may be operating over various technologies such as Worldwide Interoperability for Microwave Access (WiMAX) and infrastructure IEEE 802.11 variants, such as IEEE 802.11a/b/g/n/ac, Global System for Mobile communication (GSM), Universal Mobile Telecommunications System (UMTS), High Speed Downlink Packet Access (HSDPA), Code Division Multiple Access (CDMA), Long Term Evolution (LTE), and various others as described elsewhere herein. In some cases, a node may be a Bluetooth or Wi-Fi enabled device, such as laptops, cellular phones, Personal Digital Assistant (PDA), Smartphone, HSDPA terminal, CSMA terminal and various other access terminals.

The network 103 can be wireless network, wired network or a combination of both. For example, the network may comprise one or more of the Internet, an intranet, a cellular network, a home network, a person area network, etc., through an ISP, cellular, or broadband cable provider, and the like. The network 103 can comprise an internet protocol interfaces, such as one or more network components, data servers, connection nodes, switches, and the like. In another aspect, the sender 101 and the receiver 105 can be considered as part of the network 103.

A data packet 111 sent from the source node (e.g., sender) to the destination node (e.g., receiver) may or may not experience delay along the forward path. In some embodiments, measurement of variation or change of forward path latency may provide immediate signals of an extent of congestion. The forward path latency may be calculated by an arrival time of the data packet 111 minus send time of the data packet 111. In some embodiments, the send time of the data packet is provided by a clock 107 of the sender and the arrival/receipt time of the data packet is provided by a clock 109 of the receiver.

The sender clock 107 and the receiver clock 109 need not be synchronized. In some cases, the sender clock 107 and/or receiver clock 109 may be free running clocks that are not synchronized. In some cases, the sender clock 107 and receiver clock 109 are operating at the same rate or frequency. Alternatively, the sender clock 107 and receiver clock 109 may run at different rates or frequencies. In some cases, a common rate or frequency may be set up at the connection establishment time. For instance, the common rate or frequency is a pre-determined frequency set up by a connection protocol prior to the transmission of a data packet. In some cases, the rate or frequency associated with the sender and receiver respectively may be exchanged at the connection establishment. In some cases, the receiver may be notified by the rate or frequency of the sender. In alternatively cases, the sender and the receiver may run at different frequencies that are unacknowledged to one another. For example, the sender and the receiver both send a handshake request (e.g., a control packet with a handshake type) at connection setup where the handshake packet may comprise a common frequency that the sender and receiver both agree or frequencies associated with the sender and receiver respectively. It should be noted that the clock frequency or rate can be transmitted at any time in addition to the connection establishment time. For instance, the handshake packet comprising the frequency of the clock can be sent once at an interval when a notification message is generated or when a timeout timer expires. The clock may comprise any type of local hardware or device clock such as NIC hardware time or host device (e.g., CPU) clock. The sender clock and the receiver clock may or may not be the same type. In some situations, calibration or mapping scheme may be employed to map NIC timestamp to a host timestamp. In some situations, clock frequency drift may occur between the sender clock and the receiver clock resulting in a trend of latency change. Detection and correction of frequency drift is discussed later herein.

A timestamp representing the current time when the data packet 111 is sent may be included in the data packet 111. The timestamp may be generated by the sender clock. The timestamp can be embedded in any field of the data packet. The timestamp may be multi-bit. The timestamp may comprise any number of bits such as 32-bit or 64-bit. The timestamp may provide a time resolution at picosecond, millisecond, or microsecond scale.

In some embodiments, each data packet 111 is timestamped. Alternatively, some of the data packets are timestamped. For instance, timestamp representing send time may be included every X number of packets, where X can be any integer number.

Upon receiving a data packet comprising the timestamp, a forward path latency may be calculated by the receiver. The forward path latency may be determined by subtracting the timestamp value in the data packet from the current value of the local clock at the receiver or vice versa. Because the current value of the local clock at the receiver may not synch up with the sender clock, the differential may not represent the absolute latency. Thus the time differential may be referred to as pseudo forward path latency or pseudo-latency.

A difference or change of pseudo-latency may be used to predict an extent of congestion. The difference of change of pseudo-latency values may indicate changes in queuing delay. For example, a positive change of pseudo-latency due to increasing pseudo-latency values may indicate a rising queue, while a negative change of pseudo-latency may indicate a receding queue. In the situation when a positive change is detected, it is advantageous to react to delay without waiting for a standing queue to form thus achieve a low latency method. In the situation when a negative change is detected, it is advantageous to adjust the sending rate to fully utilize the bandwidth. In some cases, when the change of pseudo latency is determined to exceed certain extent such as by comparing the change of pseudo latency to a latency difference threshold, a notification message may be generated. The notification message may be generated when the increase change or decrease change exceeds a predetermined latency difference threshold. A congestion state may comprise a detection of the change of pseudo latency beyond the threshold. A congestion state may comprise the measured change of pseudo latency. A congestion state may further comprise any other variables related to forward path latency as discussed later herein.

Figure 2:
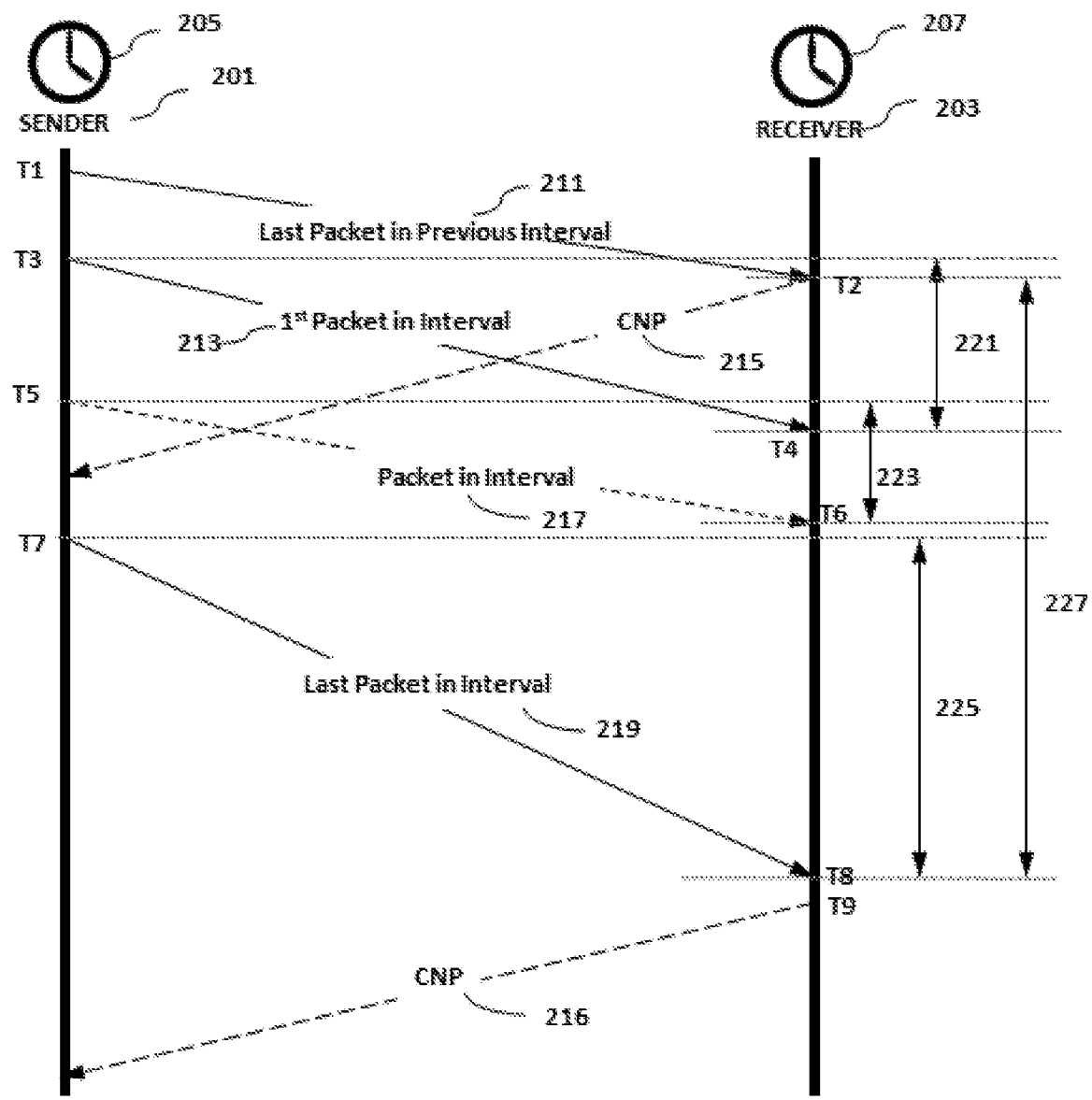
FIG. 2 schematically illustrates a plurality of variables used in a congestion management system, in accordance with embodiments of the invention.

In some embodiments, upon determination of a congestion state, a notification message may be generated by the receiver. The notification message may comprise a plurality of variables related to forward path latency. FIG. 2 schematically illustrates a plurality of variables measured in a congestion management system, in accordance with embodiments of the invention. The sender 201 and receiver 203 may be associated with local clocks 205, 207 respectively as described in FIG. 1. The sender and receiver may be configured to send and receive messages such as packeted data, data packets, control packets, notification packets, and the like. As shown in FIG. 2, one or more data packets 211, 217, 219 may be transmitted from the sender 201 to the receiver 203. In some cases, the one or more data packets may be timestamped by the local clock 205 of the sender. It should be noted that a sender and a receiver is depicted in the communication system, however any other components can be included in the system.

A data packet may be sent form the sender or the receiver at a first time and received by the other at a second time. The first time (e.g., T1) and second time (e.g., T2) may be determined by the local clocks 205, 207 respectively. The various time points such as T4 and T5, or T6 and T7 can occur simultaneously and/or in various orders. It is noted that each communication can comprise one or more packets; however, a communication is described as a single packet sent form one component to the other for readability. It is further noted that communications are depicted as non-overlapping and at various times for readability. Further, unless context suggests otherwise, any communication can overlap, can be in a different order, can be forwarded among various networks components (e.g., intermediate nodes, switches, etc). It is noted that any different amount of messages can be sent and received between the sender and receiver; likewise, the sender and the receiver can send messages to and/or receive messages from various other components not shown in the diagram.

As mentioned above, an extent of forward path latency may be determined based on a change of pseudo latency. In some embodiments, when a change of pseudo latency is determined to exceed a latency difference threshold, a notification message 215, 216 may be generated. In some cases, a new interval 227 may begin at the generation of the notification message. In some cases, a new interval 227 may begin at detection of a congestion state. In some cases, a new interval may begin at receipt time or arrival time (e.g., T2) of a last data packet 211 from the previous interval. The interval can have any length of time such as microseconds, milliseconds, seconds, and the like.

As shown in the diagram, a pseudo latency 221 of the first data packet in an interval may be calculated. Upon receiving the first data packet by the receiver 203, the receiver may subtract the timestamp value T3 in the data packet from the current value T4 of the local clock at the receiver. The pseudo latency value may be computed for one or more messages or data packets 217 sent from the sender to the receiver. A difference or change of latency may be calculated between two or more data packets.

In some cases, the change of forward path latency may be calculated as a difference between the current pseudo latency value and a previous pseudo latency value. The previous pseudo latency value may be a pseudo latency value of a single packet or an average of multiple previously obtained packets. In some cases, the previous pseudo latency value may be the pseudo latency value 221 of the first packet 213 in an interval 227. In some cases, the previous pseudo latency value may be the minimum pseudo latency value. In some cases, the previous pseudo latency value may be an average of multiple previously obtained pseudo latency values such as the first multiple packets or a moving average of multiple packets. In some cases, the previous pseudo latency value may be generated based on data from the previous interval. The previous pseudo latency value may be fixed or vary during an interval 227. For instance, when a minimum pseudo latency value tracked by the receiver 203 is taken as the previous pseudo latency value, the previous pseudo latency value may vary when the minimum value is updated. For instance, data packet 217 may have the minimum pseudo latency value 223 in the interval then for the subsequent data packets, the change of latency may be computed as the difference between the respective pseudo latency value and the minimum pseudo latency value. Similarly, when the pseudo latency value 221 of the first packet is taken as the previous pseudo latency value, for all of the subsequent data packets in the interval, the change of latency may be computed as the difference between the respective pseudo latency values and the pseudo latency value of the first packet.

In some cases, a change of forward path latency is determined as the difference between the current pseudo latency value and a previous pseudo latency value. The current pseudo latency value can be the pseudo latency value of a single packet. The current pseudo latency value can be a moving average of multiple packets. This may provide advantages to avoid instantaneous spikes in the latency measurement. Various other methods or algorithms can be used to filter the spikes. In some cases, the change of forward path latency can be a value derived from the current pseudo latency value and the previous pseudo latency value. For instance, the change of forward path latency can be dimensionless, which is the difference between the current pseudo latency value and a previous pseudo latency value divided by the previous pseudo latency value (or current pseudo latency value).

In some cases, the last packet in interval 219 is the packet with a change of pseudo latency beyond a latency difference threshold. The current pseudo latency of the last packet may or may not be a moving average. The change may be an absolute value of a differential between the current pseudo latency value and a previous pseudo latency value. The differential may be positive or negative. When the latency difference threshold is met, a notification message 216 may be generated.

In some embodiments, the change of forward path latency may be determined by the receiver. Alternatively, the change of forward path latency may be determined by the sender. In some embodiments, the state of network congestion may be determined by the receiver. Alternatively, the state of network congestion may be determined by the sender.

In some embodiments, a notification message may be generated by the receiver. The notification message may be sent from the receiver to the sender. The notification message may be sent immediately when a change of pseudo latency is determined to be beyond a latency difference threshold (e.g., message 215 sent at T2). The notification message may be sent at a time point later than the end of interval (e.g., message 216 sent at T9). The notification message may comprise a plurality of variables indicating an increase or decrease of a congestion state or queueing delay. In some embodiments, at least some of the information contained in the notification message is used by the sender for further congestion management.

Figure 3:
FIG. 3 illustrates an exemplary notification message, in accordance with embodiments of the invention.

FIG. 3 illustrates an exemplary notification message 300, in accordance with embodiments of the invention. The notification message 300 may comprise any protocol data unit or network data unit. The notification message may comprise a segment, a datagram, a packet, a frame and the like. In some cases, the notification message may be part of a data packet sent from the receiver to the sender. In some cases, the notification message may be placed in a priority queue in a scheduler of the receiver and passed to the NIC for immediate transmission. In some cases, the notification message may be transmitted as out-of-band data so that the sender or the other components of the network can be informed of the congestion state in a timely fashion.

One or more variables related to a congestion state may be included in the notification message 300. The one or more variables may comprise a change of forward path latency and/or a delivery rate during the interval, or data that can be used to calculate the change of forward path latency and/or delivery rate indirectly. In an example, the one or more variables may be selected from a group comprising: a minimum forward path latency value (e.g., 223 in FIG. 2), interval time (e.g., 227 in FIG. 2), interval bytes (i.e., sum of bytes received during the interval), pseudo latency of the first packet in the interval (e.g., 221 in FIG. 2), pseudo latency of the last packet in the interval (e.g., 225 in FIG. 2). In another example, the one or more variables may comprise a change of forward path latency value. In a further example, the one or more variables may comprise any one, some or all of the pseudo latency values calculated during in the interval. The notification message may comprise any other data related to the queue in the interval. For instance, in addition to the data related to the last received data packet, data related to multiple recent data packets may be included such that higher order derivatives of latency change can be calculated.

In some cases, the notification message 300 may comprise a message type. The message type may indicate how the notification message is triggered. The notification message may be triggered when a change of pseudo latency detected to exceed a threshold. In some embodiments, the notification message may be triggered when a lapse of time since last received packet exceeds a pre-determined lapse threshold. This may be caused by a heavy congestion that the forward path latency is drastically increased. In an example when the notification message is a notification packet, the receiver may set a first bit (or flag bit) of the packet based on the packet type. For example, the first bit of the notification packet is set to "0" correspond to a time-triggered packet type. The first bit of packet-triggered packet is set to "1" designating the packet as a packet-triggered notification packet type.

In some case, the notification message may further comprise data indicating the total bytes delivered to the receiver during the interval (e.g., interval bytes). The interval bytes and the interval time can be used to calculate a delivery rate. In some cases, the notification message may further comprise data related to a delivery rate. The delivery rate may be calculated by dividing the packet bytes delivered during the interval by the interval time.

Figure 4:
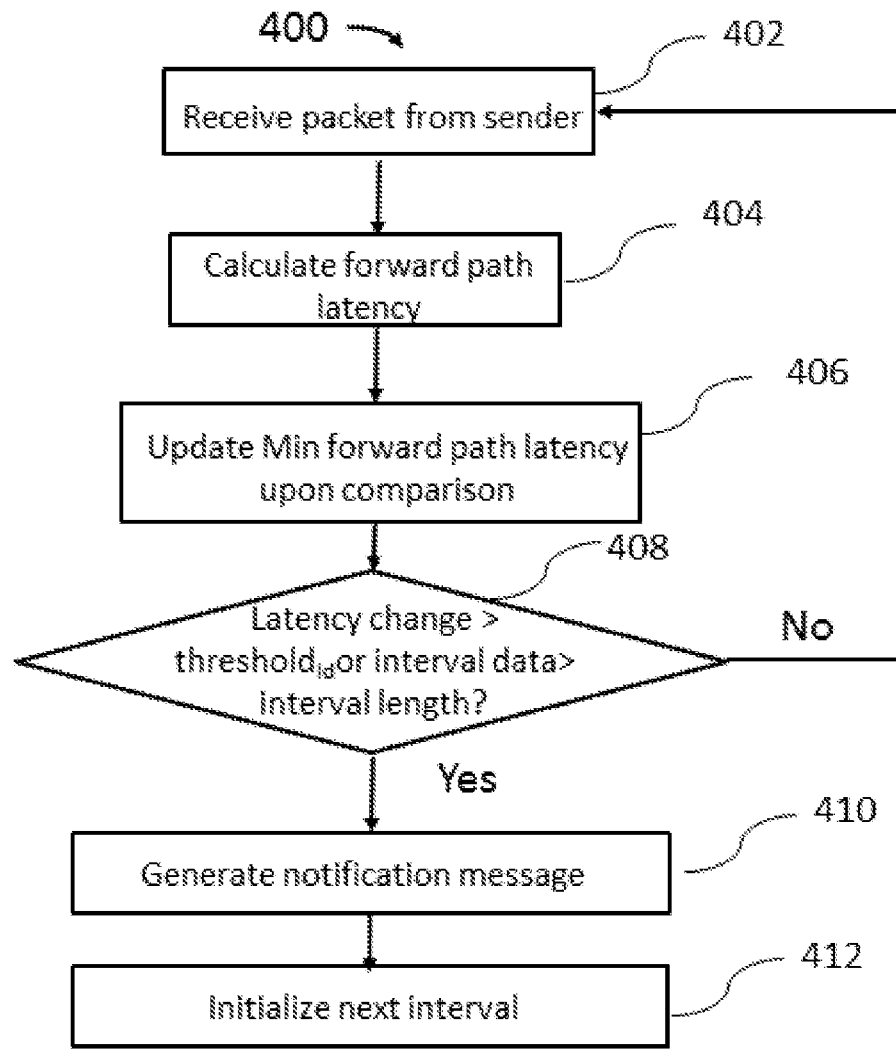
FIG. 4 is a flowchart of an exemplary method performed by a receiver.

FIG. 4 is a flowchart of an exemplary method 400 performed by a receiver. The method 400 can be performed by one or more components in a network or a communication system. The method is used to determine a congestion state based on which a notification message may be generated for further congestion management.

In some embodiments, a receiver receives a data packet from a sender 402. The data packet may comprise at least a timestamp representing a send time of the data packet. The timestamp is generated by a local clock of the sender which may not be synchronized with the local clock of the receiver. Next, a pseudo forward path latency corresponding to the network path from the sender to the receiver is measured 404. In an example, the pseudo forward path latency can be calculated as:

PacketPFL=DstClock−Packet.TimeStamp

DstClock represents the local time of the destination/receiver and Packet.TimeStamp represents timestamp generated by the source/sender clock, PacketPFL represents pseudo latency of the packet.

The data packet may be checked to see if it is the first packet in the interval. In some cases, when the data packet is the first packet the pseudo latency value of the first data packet may be recorded and later be used as a previous pseudo latency value to calculate a change in forward path latency. In some cases, the method or congestion management system keeps track of a minimum forward path latency value 406. The computed pseudo latency value may be compared with a minimum pseudo latency value. Next, the latency change may be calculated and compared to a latency difference threshold (threshold$_{ld}$) to determine a congestion state and/or generate a notification message 408. In some cases, the receiver may be configured to reset the interval every certain number of data packets. In the example, a size of data in the interval may be compared with an interval length threshold and a new interval may be initiated when the size of data is beyond the interval length threshold. By reset the interval every pre-determined interval length, it is beneficial to prevent an accumulation of clock frequency jitter and/or frequency drift between the sender clock and receiver clock.

It should be noted that the latency difference threshold and/or the interval length threshold are configurable parameters. These parameters may or may not be the same across different intervals. These parameters may or may not vary according to different network condition in real time. These parameters may be determined by the receiver or the sender. Alternatively, these parameters may be determined by other components in the system.

Next, if the latency change is determined to exceed the latency difference threshold or the interval bytes exceeds the interval length threshold, a notification message may be generated 410. The notification message may comprise a plurality of variables as described elsewhere herein. Below is an exemplary algorithm for triggering a congestion notification message (CNP).

```
@ every data packet
QState.IntervalBytes += Packet.Bytes
If (QState.IntervalBytes >= IntervalLength) OR (ABS(PacketPFL −
QState.LastPFLReported) > LatencyDifferenceThreshold))
//Prepare and Send CNP
   CNP.Type = PACKETTRIGGER
   CNP.IntervalMinPFL = QState.IntervalMinPFL
   CNP.IntervalFirstPFL = QState.IntervalFirstPFL
   CNP.IntervalLastPFL = PacketPFL
   CNP.IntervalTime = DstClock − QState.IntervalStartTime
   CNP.IntervalStartMarker = QState.IntervalStartMarker
   CNP.IntervalBytes = QState.IntervalBytes
   SendCNP(CNP)
```

CNP.IntervalFirstPFL represents the pseudo latency of the first packet in the interval which is used to determine the change of forward path latency. CNP.IntervalLastPFL presents the pseudo latency of the last packet in the interval which may be used to determining a queueing delay when it is compared to the minimum latency value. It should be noted that various other data may be added to the CNP or substitute one or more variables in the CNP as shown in the list above.

The receiver may initialize the next interval 412. Below is a list of exemplary variables initialized for the next interval. Packet.BytesMarker is used by the sender to calculate how many bytes in flight it has at any point in time.
   QState.IntervalStartTime=DstClock
   QState.IntervalStartMarker=Packet.BytesMarker
   QState.IntervalBytes=0
   QState.LastPFLReported=PacketPFL Although FIG. 4 shows a method in accordance with some embodiments a person of ordinary skill in the art will recognize many adaptations for variations. For example, the steps can be performed in any order (e.g., step 406 can be performed after step 408). Some of the steps may be deleted, some of the steps repeated, and some of the steps may comprise sub-steps of other steps. The method may also be modified in accordance with other aspects of the disclosure as provided herein.

Figure 5:
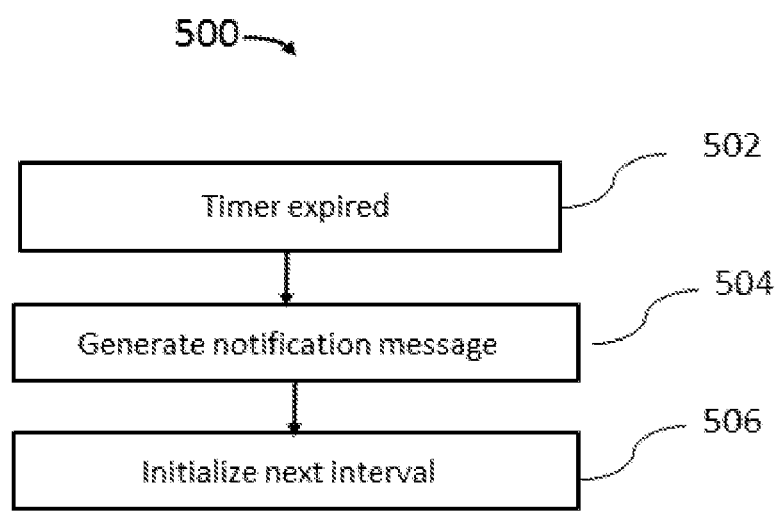
FIG. 5 is a flowchart shows an exemplary process of triggering a notification message upon a timer event.

In some embodiments, a notification message may be triggered by a timer event as mentioned above. A notification message may be triggered when a lapse of time since last received packet exceeds a pre-determined lapse threshold. FIG. 5 is a flowchart shows an exemplary process 500 of triggering a notification message upon a timer event. In some cases, a timer may be reset or restarted at the end of a process such as the process described in FIG. 4 or when the timer expires 502. Alternatively, the timer may be restarted for every received packet so that the timer event is effected when there are no packets received. Lapse time may be counted by the timer. When the timer expires a notification message may be generated 504 then next interval may be initialized 506. Below is an exemplary notification message (CNP) generated upon a timer event.

```
//Prepare and Send CNP
CNP.Type = TIMETRIGGER
CNP.IntervalMinPFL = QState.IntervalMinPFL
   CNP.IntervalFirstPFL = QState.IntervalFirstPFL
   CNP.IntervalLastPFL = N/A
   CNP.IntervalTime = DstClock − QState.IntervalStartTime
   CNP.IntervalStartMarker = QState.IntervalStartMarker
   CNP.IntervalBytes = QState.IntervalBytes
   SendCNP( )
```

The initial value of the timer may be a parameter that can be configured by the receiver or the sender. Similarly, the parameter can be configured by other components in the system.

In another aspect, a packet flow rate may be adjusted based at least in part on the latency change. The packet flow rate may be adjusted in response to the latency change according to a pre-determined reaction scheme. The packet flow rate may be adjusted based on one or more variables provided in the notification message. The reaction scheme may be a rate-based congestion control algorithm that limits the total number of packets or sending rate of packets injected into the network pipe.

In some embodiments, upon receiving the notification message sent by the receiver, the sender may react according to the reaction scheme. The reaction scheme may determine one or more control parameters such as target rate, sending rate, or schedule of the next data packet delivery time and various others. Various algorithms or methods can be employed to determine the control parameters. The method may comprise adjusting, for example, a sending rate based at least in part on the change of forward path latency. For example, the sending rate may be proportional to the change of forward path latency such that when a greater amount of change is detected, the sending rate may be increased or decreased by an associated amount.

The reaction scheme may establish a relationship between the one or more control parameters and the one or more variables/derivatives provided by the notification message. The relationship may comprise any function that may or may not be linear. The one or more control parameters may be adjusted as a function of one or more congestion variables. The reaction scheme may comprise one or more coefficients for adjusting the packet flow rate. The one or more coefficients may be pre-determined or adaptive. The one or more congestion variables may be provided by the notification message directly or derived from the variables provided by the notification message. The one or more congestion variables may comprise, for example, a $1^{st}$ order derivative of the forward path latency change, a $2^{nd}$ order derivative of the forward path latency change, higher order derivatives, or a deliver rate during the interval. A deliver rate may be calculated by below equation:

DeliveryRate=$CNP$.IntervalBytes/$CNP$.IntervalTime

In some cases, a sending rate may be adjusted based on queueing delay. The queueing delay may be determined based on the pseudo latency value of the last data packet in the interval and the minimum stored latency value. The pseudo latency value of the last data packet may or may not be a moving average of multiple data packets. The minimum stored latency value may be tracked by the sender. Below is a sample method for estimating the queueing delay. The method may be performed by the sender upon receiving a congestion control packet (CNP). The method may comprise steps of updating a minimum latency value stored at the sender, correcting clock frequency drift, calculating delivery rate, queueing delay, adjusting send rate (e.g., adjust bytes in flight limit) and the like.

---

Upon receiving CNP
//discard old CNPs
If CNP is older than one that we already processed
    then discard CNP
//Update MinPFL stored at the sender
If (CNP.MinPFL < QState.MinPFL)
    QState.MinPFL = CNP.MinPFL
elseif ((QState.MinPFL − CNP.MinPFL) < FREQDRIFT_THRESHOLD)
    QState.MinPFL = CNP.MinPFL
DeliveryRate = CNP.IntervalBytes / CNP.IntervalTime
BytesInFlight = QState.BytesMarker − CNP.IntervalStartMarker − CNP.IntervalBytes
QueueingDelay = CNP.IntervalLastPFL − QState.MinPFL
//Adjust QState.SendRate and QState.BytesMarkerLimit
AdjustRateandLimit(QState,DeliveryRate,BytesInFlight,QueueingDelay)
If (QueueingDelay > QUEUEINGDELAYTHRESHOLD)
    //set limit to bytes in flight proportional to current BytesInFlight
else
    //clear limit to bytes in flight
    QState.BytesMarkerLimit = QState.BytesMarker − 1
If (QState.SendRate > DeliveryRate)
    //reduce sending rate proportionally
else
    //probe for extra bandwidth

---

It should be noted that the above is for illustrative purpose only. Various steps can be realized using different other algorithms. For example, the QState.BytesMarkerLimit is adjusted using modulo arithmetic, however, the limit can be adjusted using various other algorithms that can be more or less aggressive.

Figure 6:
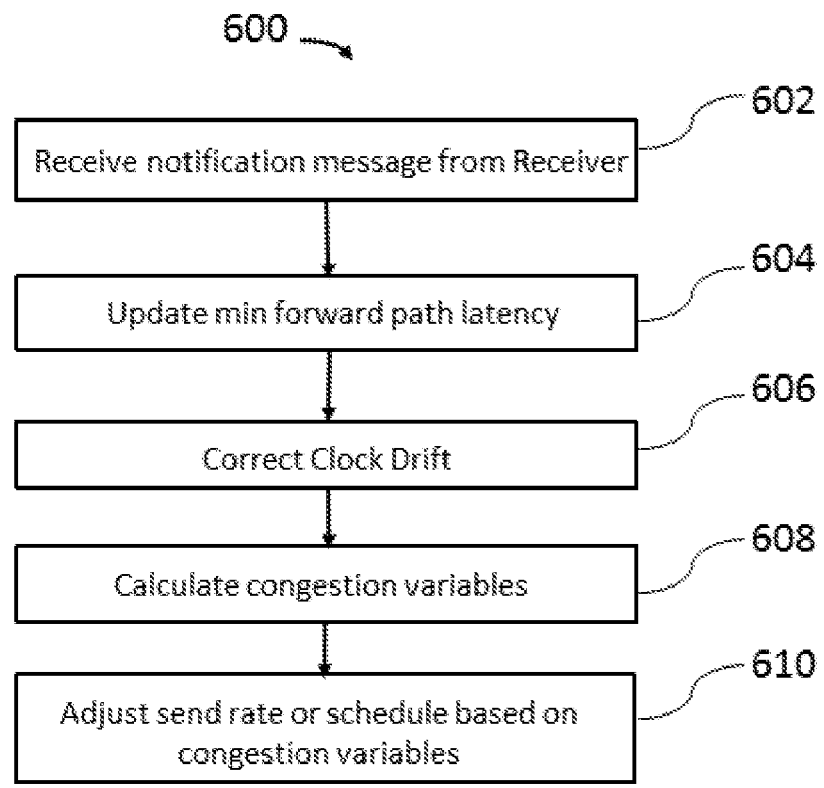
FIG. 6 shows a flowchart illustrating an exemplary method for user at a sender for congestion management, in accordance with embodiments of invention.

FIG. 6 shows a flowchart illustrating an exemplary method 600 at a sender for congestion management, in accordance with embodiments of invention. Sender receives a notification message from a receiver 602. For example, sender (source) in a network may receive notification message sent from a receiver/destination at the determination of a congestion state. The notification message can be the same notification message as described elsewhere herein. In some cases, the sender may keep tracking of a minimum forward path latency value 604. The minimum forward path latency value may be used to detect clock frequency drift 606. In some embodiments, a clock frequency drift between the sender clock and the receiver clock may be detected by monitoring the minimum forward path latency value. For example, if the receiver clock runs faster than the sender clock, the minimum forward path latency value tends to increase. If the current minimum forward path latency value provided by the current notification message is greater than a recorded minimum forward path latency value by certain threshold, the sender and/or receiver may reset its pseudo latency field. In some cases, a frequency drift is prevented by resetting one or more previously obtained latency values stored in a memory accessible by the sender and/or the receiver. In some cases, once the difference of minimum forward path latency value is determined to be beyond a threshold, the pseudo latency field of the sender and/or receiver may be reset, the frequency of the receiver/sender clock may be reset or the stored minimum forward path latency value may be updated to a current value.

Next, one or more congestion variables may be calculated 608. The one or more congestion variables may comprise at least the change of forward path latency and/or delivery rate. The one or more congestion variables may comprise various others derived from the variables provide by the notification message as described above. The one or more congestion variables may be selected according to a pre-determined reaction scheme. Finally, one or more congestion control parameters (e.g., send rate, schedule of next data packet, etc) are adjusted based on the one or more congestion variables and the pre-determined reaction scheme 610.

Although FIG. 6 shows a method in accordance with some embodiments a person of ordinary skill in the art will recognize many adaptations for variations. For example, the steps can be performed in any order (e.g., step 604 or 606 can be performed after step 610). Some of the steps may be deleted, some of the steps repeated, and some of the steps may comprise sub-steps of other steps. The method may also be modified in accordance with other aspects of the disclosure as provided herein.

Figure 7:
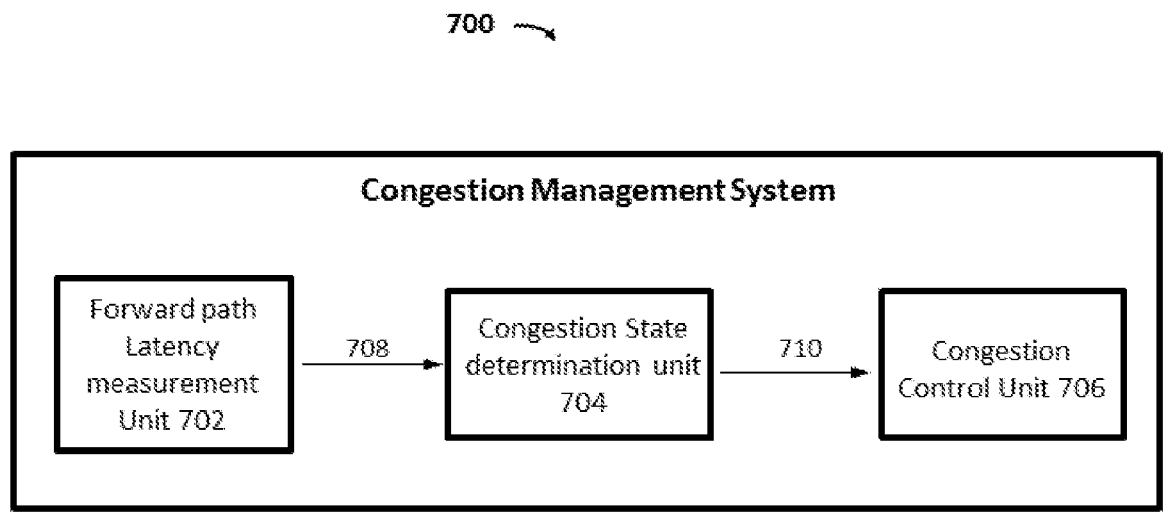
FIG. 7 shows a block diagram of an exemplary congestion management system, in accordance with embodiments of the invention.

FIG. 7 shows a block diagram of an exemplary congestion management system 700, in accordance with embodiments of the invention. In some embodiments, the congestion management system 700 may comprise a forward path latency measurement unit 702, a congestion state determination unit 704 and a congestion control unit 706. The forward path latency measurement unit 702 may be configured to measure a pseudo forward path latency for one or more packets received by a receiver. The measured data 708 may be forwarded to a congestion state determination unit 704 for determining a congestion state. Depending on the congestion state, a notification message 710 may be generated and transmitted to the congestion control unit 706. The congestion control unit 706 may adjust one or more congestion control parameters according to a reaction scheme and latency related data provided by the notification message.

The pseudo forward path latency 708 may be calculated by the forward path latency measurement unit 702. The pseudo forward path latency 708 may be computed for each data packet received by the receiver. Alternatively, the pseudo forward path latency may be computed for every multiple data packets. The forward path latency measurement unit 702 may be a standalone device. Alternatively, the forward path latency measurement unit 702 may be a component of the receiver or a component of the congestion state determination unit 704. The forward path latency measurement unit 702 may be located at the receiver or remote to the receiver.

The congestion state determination unit 704 may be configured to determine a congestion state of the forward path based on the pseudo forward path latency 708 received from the forward path latency measurement unit 702. The congestion state may be determined based on one or more variables that comprise at least a change of forward path latency. A notification message may be generated by the congestion state determination unit 704 if the change is determined to be beyond a threshold as described elsewhere herein. The notification message 710 may then be transmitted to the congestion control unit 706. The congestion state determination unit 704 may be a standalone device. Alternatively, the congestion state determination unit 704 may be component of the receiver or the same component as of the forward path latency measurement unit 702. The congestion state determination unit 704 may be located at the receiver or remote to the receiver. When the congestion state determination unit 704 and the forward path latency measurement unit 702 are separate components, the measured pseudo forward path latency data 708 may be transmitted via wired or wireless connection.

The forward path latency measurement unit 702 and/or the congestion state determination unit 704 can have one or more processors and at least one memory for storing program instructions. The processors may be located at the receiver. The processors may be part of the receiver. Alternatively, the processors may be located remote to the receiver. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the forward path latency measurement unit 702 and/or the congestion state determination unit 704 can be implemented in hardware components (e.g., ASICs, special purpose computers, or general purpose computers), software or combinations of hardware and software.

The congestion control unit 706 may receive the notification message 710 from the congestion state determination unit 704. The congestion control unit 706 may be configured to perform one or more steps as described in FIG. 6. The congestion control unit 706 may be a standalone device in communication with the sender (source) and/or the receiver (destination). Alternatively, the congestion control unit 706 may be a component of the sender (source).

The congestion control unit 706 can have one or more processors and at least one memory for storing program instructions. The processors may be located at the sender. The processors may be part of the sender. Alternatively, the processors may be located remote to the sender. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the congestion control unit 706 can be implemented in hardware components (e.g., ASICs, special purpose computers, or general purpose computers) software, or combinations of hardware and software.

For a software implementation, techniques described herein may be implemented with modules (e.g., forward path latency measurement unit 702, congestion state determination unit 704 or congestion control unit 706) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Further, the actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for managing network congestion, comprising:

a) receiving, at a receiver, a packet comprising a timestamp provided by a first clock of a sender;

b) deriving, by the receiver, a latency value based at least in part on the timestamp provided by the first clock and a receipt time provided by a second clock of the receiver;

c) determining a latency change by comparing the latency value with a previous latency value, wherein the latency change is determined by comparing an average of a sequence of latency values within a window with the previous latency value; and d) determining a state of network congestion based at least in part on the latency change.

2. The method of claim 1, wherein the packet is a regular packet.

3. The method of claim 1, wherein the packet is a notification packet.

4. The method of claim 3, wherein the packet is a congestion notification packet.

5. The method of claim 1, wherein the first clock and the second clock are not synchronized.

6. The method of claim 1, wherein the first clock and the second clock operate at different frequencies.

7. The method of claim 6, wherein the frequency of the first clock is known by the receiver during a connection setup between the sender and receiver.

8. The method of claim 1, wherein the latency value is associated with a forward path latency.

9. The method of claim 1, wherein the latency value is derived by calculating the time difference between the timestamp and the receipt time provided by the second clock.

10. The method of claim 1, wherein the state of network congestion is determined by comparing the latency change against a threshold, wherein the threshold is configurable.

11. The method of claim 10, wherein the state of network congestion is determined when the latency change is above the threshold.

12. The method of claim 1, wherein the latency change, the state of network congestion, or both the latency change and the state of network congestion is determined by the receiver.

13. The method of claim 1, wherein the latency change, the state of network congestion, or both the latency change and the state of network congestion is determined by the sender.

14. The method of claim 1, further comprising adjusting a packet flow rate based at least in part on the latency change.

15. The method of claim 14, wherein the packet flow rate is adjusted in response to the latency change according to a pre-determined reaction scheme.

16. The method of claim 15, wherein the reaction scheme comprises adjusting the packet flow rate based on the latency change, the first order derivative of latency change, the second order derivative of latency change, a delivery rate, or a combination of the above.

17. The method of claim 15, wherein the reaction scheme comprises one or more coefficients for adjusting the packet flow rate.

18. A method for managing network congestion, comprising:

a) receiving, at a sender, a report message comprising a latency change, wherein the latency change is associated with a one-way path from the sender to a receiver, wherein the latency change is obtained by comparing an average of a sequence of latency values within a window with a previous latency value; and b) adjusting a packet flow rate based at least in part on the latency change.

19. The method of claim 18, wherein the report message is a congestion notification packet generated by the receiver, wherein the congestion notification packet is generated upon determination of a state of network congestion.

20. The method of claim 19, wherein the state of network congestion is determined by comparing the latency change against a threshold, wherein the threshold is pre-determined or configurable.

21. The method of claim 20, wherein the state of network congestion is determined when the latency change is above the threshold.

22. The method of claim 19, wherein the congestion notification packet is generated at receipt of a packet by the receiver or when a lapse of time since last received packet exceeds a pre-determined lapse threshold, and wherein the packet is generated by the sender.

23. The method of claim 18, wherein the packet flow rate is adjusted in response to the latency change according to a pre-determined reaction scheme.

24. The method of claim 23, wherein the reaction scheme comprises adjusting the packet flow rate based on the latency change, the first order derivative of latency change, the second order derivative of latency change, a delivery rate or a combination of the above.

25. The method of claim 23, wherein the reaction scheme comprises one or more coefficients for adjusting the packet flow rate.

26. A method for managing network congestion, comprising:

a) receiving, at a receiver, a packet comprising a timestamp provided by a first clock of a sender;

b) deriving, by the receiver, a latency value based at least in part on the timestamp provided by the first clock and a receipt time provided by a second clock of the receiver;

c) determining a latency change by comparing the latency value with a previous latency value; and d) determining a state of network congestion based at least in part on the latency change;

wherein the first clock and the second clock operate at a pre-determined frequency; and wherein a frequency drift is prevented by resetting one or more previously obtained latency values stored in a memory accessible by the receiver.

27. The method of claim 26, wherein the pre-determined frequency is set up prior to transmission of the packet.

28. The method of claim 26, wherein the pre-determined frequency is set up by a connection protocol.

29. A method for managing network congestion, comprising:

a) receiving, at a receiver, a packet comprising a timestamp provided by a first clock of a sender;

b) deriving, by the receiver, a latency value based at least in part on the timestamp provided by the first clock and a receipt time provided by a second clock of the receiver;

c) determining a latency change by comparing the latency value with a previous latency value; and d) determining a state of network congestion based at least in part on the latency change;

wherein the first clock and the second clock operate at a pre-determined frequency; and wherein a frequency drift is detected based on a minimum latency value tracked by the sender.

30. The method of claim 29, wherein the pre-determined frequency is set up prior to transmission of the packet.

31. The method of claim 29, wherein the pre-determined frequency is set up by a connection protocol.

32. A method for managing network congestion, comprising:
  a) receiving, at a receiver, a packet comprising a timestamp provided by a first clock of a sender;
  b) deriving, by the receiver, a latency value based at least in part on the timestamp provided by the first clock and a receipt time provided by a second clock of the receiver;
  c) determining a latency change by comparing the latency value with a previous latency value, wherein the previous latency value is a minimum latency value or a latency value of a first packet among one or more previously obtained latency values, and wherein the minimum latency value is updated when the latency change is a decrease; and
  d) determining a state of network congestion based at least in part on the latency change.

33. The method of claim 32, wherein the one or more previously obtained latency values are calculated by the receiver and stored in a memory accessible by the receiver.

34. A method for managing network congestion, comprising:
  a) receiving, at a receiver, a packet comprising a timestamp provided by a first clock of a sender;
  b) deriving, by the receiver, a latency value based at least in part on the timestamp provided by the first clock and a receipt time provided by a second clock of the receiver;
  c) determining a latency change by comparing the latency value with a previous latency value;
  d) determining a state of network congestion based at least in part on the latency change;
  e) generating a report message comprising the latency change, wherein the report message is a congestion notification packet; and
  f) adjusting a packet flow rate when a lapse of time since a last received report message exceeds a pre-determined lapse threshold.

35. The method of claim 34, wherein the report message is contained in a regular data packet transmitted from the receiver to the sender.

36. The method of claim 34, wherein the report message is transmitted from the receiver to the sender.

37. The method of claim 34, wherein the report message is generated upon determination of the state of network congestion.

38. The method of claim 34 wherein the report message is generated at receipt of the packet by the receiver or when a lapse of time since last received packet exceeds a pre-determined lapse threshold.

39. The method of claim 34, wherein the report message further comprises a minimum latency value among one or more previously obtained latency values and/or a delivery rate.

40. A method for managing network congestion, comprising:
  a) receiving, at a sender, a report message comprising a latency change, wherein the latency change is associated with a one-way path from the sender to a receiver, wherein the report message further comprises a minimum latency value among one or more previously obtained latency values and/or a delivery rate;
  b) adjusting a packet flow rate based at least in part on the latency change; and
  c) adjusting a packet flow rate when a lapse of time since a last received report message by the sender exceeds a pre-determined lapse threshold.

41. The method of claim 40, wherein the minimum latency value is used for deriving the latency change.

42. A method for managing network congestion, comprising:
  a) receiving, at a sender, a report message comprising a latency change, wherein the latency change is associated with a one-way path from the sender to a receiver, wherein the latency change is obtained by comparing a latency value with a previous latency value, wherein the latency value is obtained based at least in part on a timestamp provided by a first clock of the sender and a receipt time provided by a second clock of the receiver, wherein the previous latency value is a minimum latency value among one or more previously obtained latency values, and wherein the minimum latency value is updated when the latency change is a decrease; and
  b) adjusting a packet flow rate based at least in part on the latency change.

43. The method of claim 42, wherein the first clock and the second clock are not synchronized.

44. The method of claim 42, wherein the one or more previously obtained latency values are calculated by the receiver and stored in a memory accessible by the receiver.

* * * * *